United States Patent
Mayr et al.

(10) Patent No.: US 8,459,727 B2
(45) Date of Patent: Jun. 11, 2013

(54) TRACTOR CABS

(75) Inventors: Stefan Mayr, Bobing (DE); Roland Pest, Langenmosen (DE); Hermann Geiss, Marktoberdorf (DE); Andreas Stieglitz, Marktoberdorf (DE)

(73) Assignee: AGCO GmbH, Marktoberdorf (DE)

( * ) Notice: Subject to any disclaimer, the term of this patent is extended or adjusted under 35 U.S.C. 154(b) by 32 days.

(21) Appl. No.: 13/124,748

(22) PCT Filed: Oct. 26, 2009

(86) PCT No.: PCT/EP2009/064056
§ 371 (c)(1),
(2), (4) Date: Jun. 21, 2011

(87) PCT Pub. No.: WO2010/049380
PCT Pub. Date: May 6, 2010

(65) Prior Publication Data
US 2011/0241380 A1 Oct. 6, 2011

(30) Foreign Application Priority Data

Oct. 27, 2008 (GB) .................................. 0819562.0

(51) Int. Cl.
*B62D 33/06* (2006.01)
(52) U.S. Cl.
USPC ........................ 296/190.09; 296/208; 454/144
(58) Field of Classification Search
USPC ................ 296/190.09, 193.07, 208; 454/136, 454/137, 144
See application file for complete search history.

(56) References Cited

U.S. PATENT DOCUMENTS

| | | | | |
|---|---|---|---|---|
| 4,088,364 A | * | 5/1978 | Termont | 296/190.09 |
| 5,119,718 A | * | 6/1992 | Wagner et al. | 454/158 |
| 7,537,074 B2 | * | 5/2009 | Ishii et al. | 180/89.12 |
| 2001/0029162 A1 | * | 10/2001 | Yoshinori et al. | 454/137 |
| 2006/0170251 A1 | * | 8/2006 | Ishii et al. | 296/190.09 |

FOREIGN PATENT DOCUMENTS

| | | |
|---|---|---|
| DE | 3024145 C2 | 1/1981 |
| EP | 1551665 A1 | 7/2005 |
| EP | 1609701 A | 12/2005 |
| FR | 2860483 A1 | 4/2005 |
| JP | 06060656 U | 8/1994 |
| JP | 1222027 | 8/1999 |
| SU | 753684 A1 | 12/1977 |
| SU | 1675130 A1 | 9/1991 |

OTHER PUBLICATIONS

UK Search Report for Application No. GB0819562.0 dated Feb. 23, 2009.
International Search Report from International Application No. PCT/EP2009/064056 Dated Dec. 22, 2009.

* cited by examiner

*Primary Examiner* — Jason S Morrow (57) ABSTRACT

A tractor cab has a floor (12) at least part of which is of a double layer construction having an upper layer (12a) and a lower layer (12b) spaced vertically below the upper layer to define a cavity (29,30) between the layers. The cavity being used for a) the passage of air associated with heating, ventilating, demisting or air conditioning the cab and/or b) the passage of electrical wiring or hydraulic pipes and hoses and/or c) the storage of fluids or other materials or equipment. Part of the floor supports an HVAC unit (11) whose output is directed between the upper and lower layers. The upper layer (12a) includes output apertures (27a, 28a) through which air from the HVAC unit can be discharged or recirculated.

7 Claims, 9 Drawing Sheets

TRACTOR CABS

TECHNICAL FIELD

This invention relates to tractor cabs and in particular to such cabs having heating, ventilating and air conditioning (HVAC) systems.

BACKGROUND

The term "HVAC system" or "HVAC unit" as used throughout this patent application is to be interpreted as covering a system or unit which at its simplest simply draws air in via the filter and distributes this filtered air to the inside of the cab or a system or unit which additional heats and/or conditions the air which is drawn in via the filter.

Such HVAC systems include a HVAC unit which draws air in from the outside of the cab via an air intake and ducting and deliver processed air to the interior of the cab by further ducting. The HVAC unit may be installed in a number of locations such as in the roof of the cab, below the driver's seat and even below the cab floor. Whilst mounting the HVAC unit in the roof may simplify the ducting connecting the unit to the air intake and the cab it presents problems in delivering air to the desired zones, for example, for de-icing the windscreen of the cab and for heating or cooling the driver as this is difficult to do satisfactorily using air jets directed downwardly from the roof. Also HVAC units mounted on or below the floor are problematical as they require extensive ducting which has sealing and insulating problems and requires expensive tooling for manufacture as well as requiring relatively complex installation procedures.

It is an object of the present invention to provide a tractor cab construction which offer a solution to the above problem of interconnecting the HVAC unit with its outlets into the cab and which also has other installation advantages.

A tractor cab having a floor at least part of which is of a double layer construction having an upper layer and a lower layer spaced vertically below the upper layer to define a cavity therebetween, an HVAC unit supported on the lower layer of the floor with the output of the HVAC unit directed through passages formed between the layers the upper layer including output apertures through which air from the HVAC unit can be discharged or recirculated.

As will be appreciated, a cab with such a floor structure has significant advantages in the connection of air, electrical wiring and/or hydraulic pipes and hoses as well as providing additional storage for fluids or other materials.

In a preferred arrangement the upper layer is generally flat and the lower layer is curved in three dimensions to define passages between the layers along which air and/or wires and/or pipes and/or hoses can extend or volumes in which fluid or other materials and equipment can be stored.

The HVAC unit may be partially recessed into the floor by being supported in a depression formed in the lower layer of a rear portion of the floor and air from the HVAC unit is directed forwardly along passages formed between the layers to air openings formed in a front portion of the floor and/or in side portions of the floor, a support structure being provided above the HVAC unit on which a driver's seat is mounted. Such an arrangement is particularly convenient and provides a seat mounting above the HVAC unit without the seat being too high.

Outlet ducts are preferably connected with the air openings in the front portion of the floor to direct air towards a windscreen of the cab and the front of a driver and ducts are connected with the air openings in the side portions of the floor to direct air towards side windows of the cab and the side of the driver The floor layers can be formed from metal sheets welded together or from reinforced plastics material which is glued or otherwise secured together.

The invention also provides a tractor cab HVAC system in which HVAC unit is connected with air outlets into the cab via passages formed in a two layer floor as described above.

BRIEF DESCRIPTION OF THE DRAWINGS

The present invention will now be described, by way of example only, with reference to the accompanying drawings in which:—

DESCRIPTION OF EXAMPLE EMBODIMENTS

Figure 1:
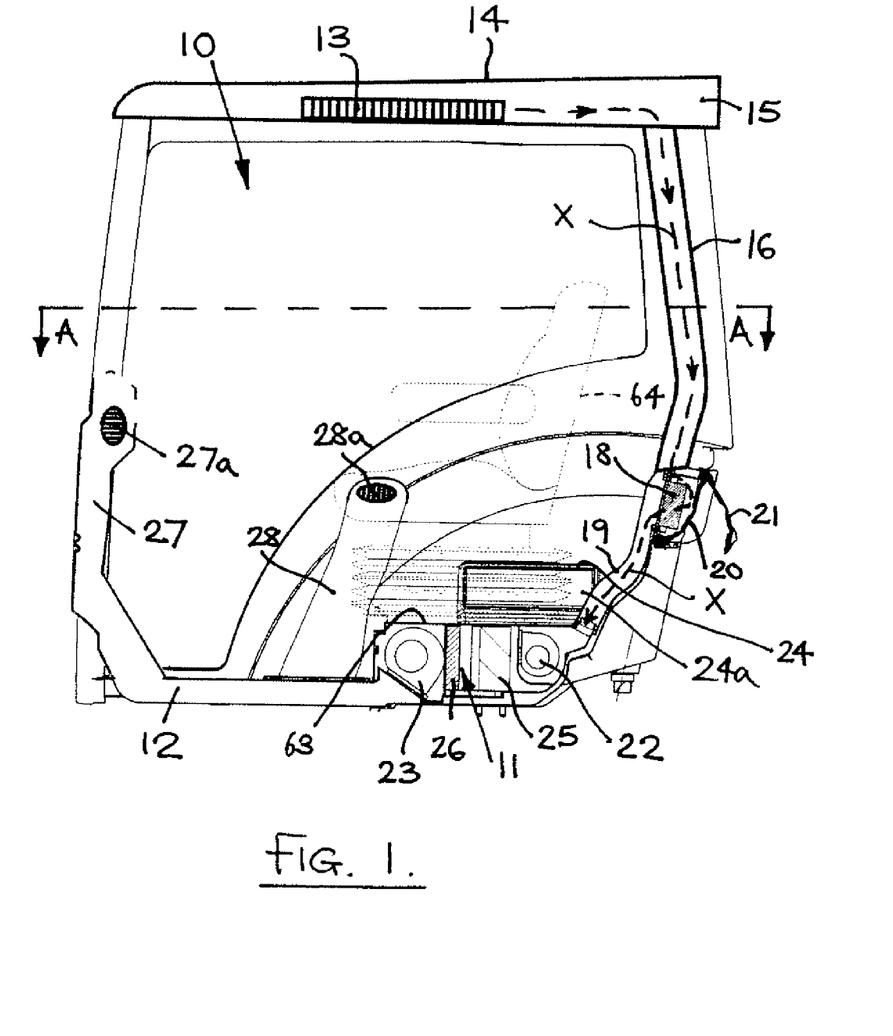
FIG. 1 shows a side view, partly in section, of a tractor cab having a two layer floor in accordance with the present invention.
Figure 2:
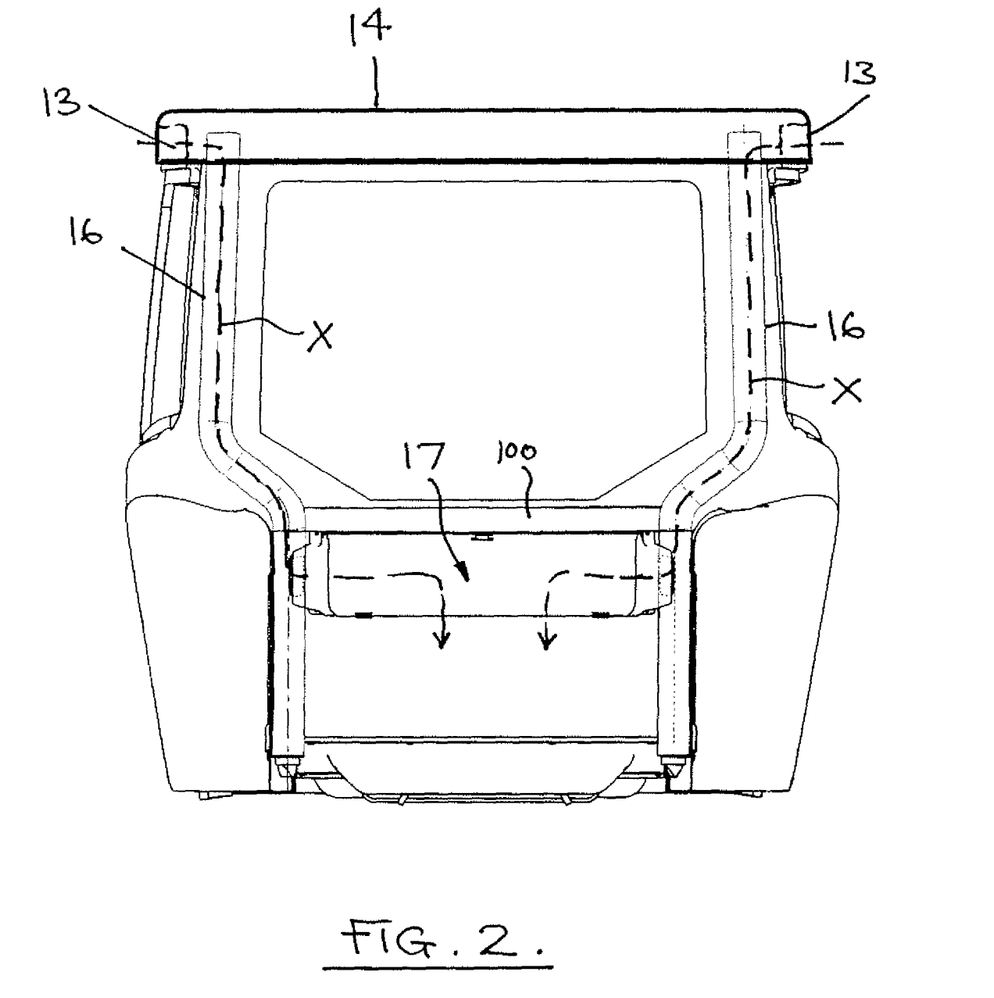
FIG. 2 show a rear view of the cab of FIG. 1.
Figure 3:
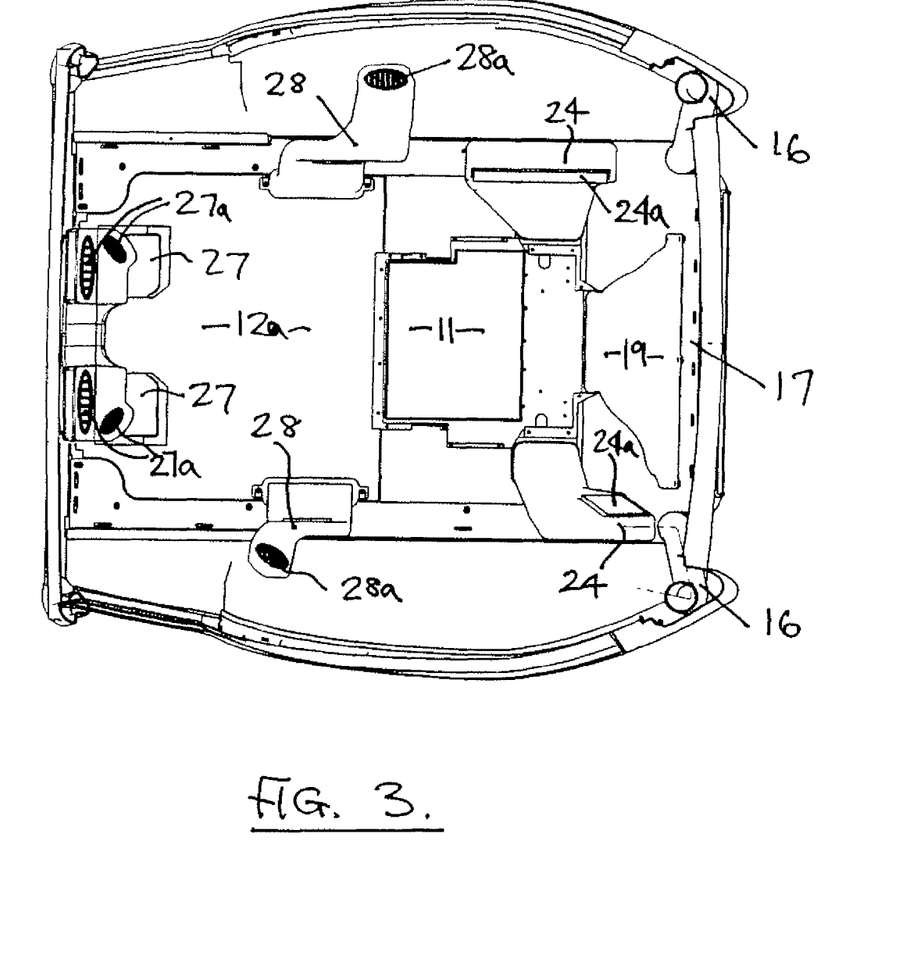
FIG. 3 shows a section on the line A-A of FIG. 1.
Figure 4:
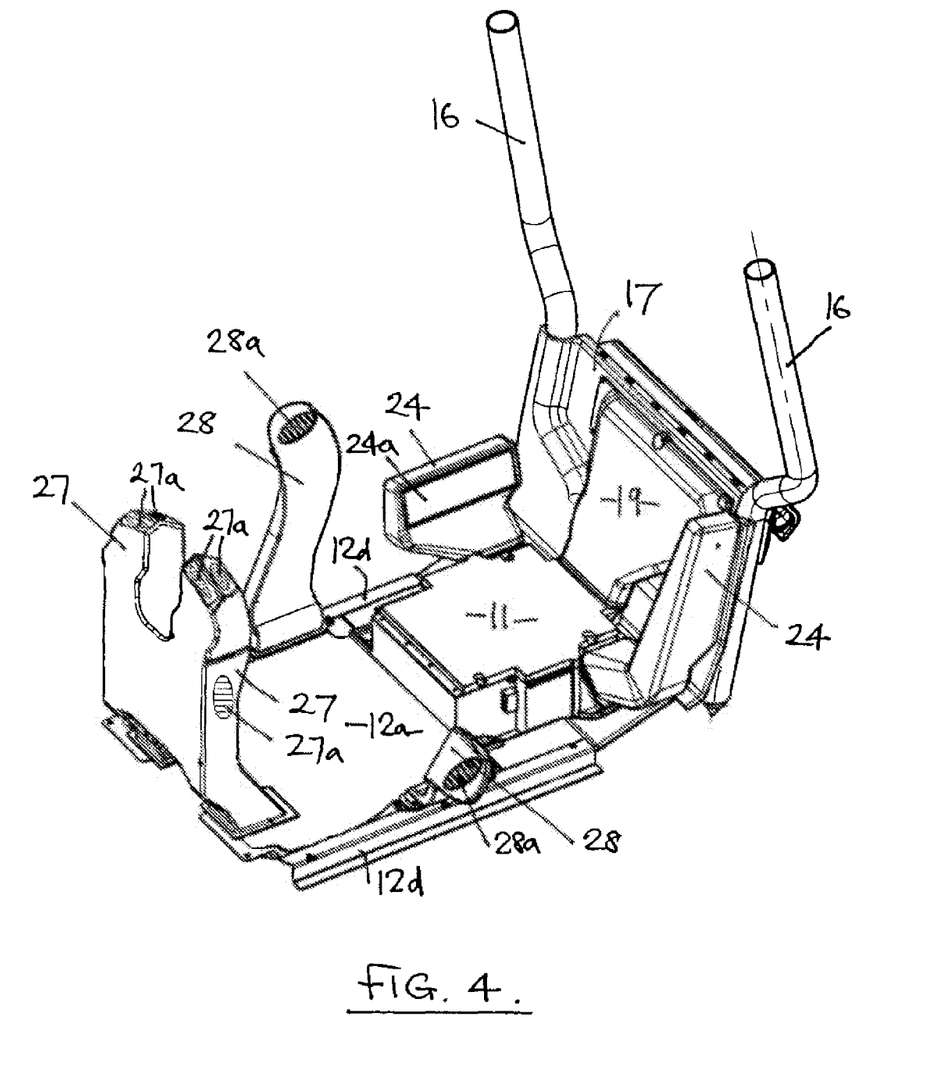
FIG. 4 shows a perspective view of part of the lower part of the cab of FIG. 1.

Referring to the drawings, a tractor cab 10 has a HVAC unit 11 mounted on the floor 12 of the cab. Air intakes 13 are provided in the sides of the roof 14 of the cab through which air is drawn into the HVAC unit 11 via ducts 15 in the roof and both hollow rear pillars 16 of the ROPS (Roll Over Protection Structure) of the cab and hence through a fresh air filter unit 17 which contains a filter element 18 into a duct 19 connected with the intake of the HVAC unit 11. A cross member 100 extends between the pillars 16. By drawing air into the system via intakes 13 in the roof the level of dust and dirt in the intake air is minimised. The air flow from intakes 13 to the HVAC unit 11 is shown by the dotted line paths X in FIGS. 1 and 2.

The air enters filter unit 17 generally horizontally from both sides. The air filter unit has a housing 20 provided with an opening access door 21 enabling the operator to access the filter element 18 for maintenance or renewal.

The HVAC unit 11 includes a pressurization blower 22 to overcome the pressure drop caused by the long air intake path X, which is somewhat restrictive due to being narrow and including various bends. A main blower 23 is also provided to push air from the HVAC unit 11 into the cab, to draw air through an evaporator 25 and a heater core 26 and to suck air into the unit via recirculation ducts 24 via path Y. Main blower 23 is not provided to suck the air into the HVAC unit along intake path X. Without the pressurization blower 22, the air flow from the HVAC unit would be too small for reasonable system performance.

The heater core 26 is provided with an electronically controlled valve (not shown) for regulating the mass flow and therefore the heating performance of the heater core 26. The evaporator is also equipped with an evaporator valve (not shown) for vapourizing the refrigerant. Additionally the overall control unit for the HVAC system can be housed within a housing 40 of the HVAC unit 11. The HVAC unit 11 also has an external central electric connector for all the electrical connections of the unit thus providing easy plug and play installation of the HVAC unit.

The main blower 23 distributes air from the HVAC unit to a front distributor 27 to provide air to defrost/defog the front screen and front windows of the cab and also provide processed air for the driver. Fender distributors 28 on the left and right fender provide air to the side windows of the cab and also to the side of the driver. All these distributors 27 and 28 are equipped with nozzles 27a and 28a respectively to control the air distribution within the cab. These nozzles can be adjustable and/or closed by hand.

Figure 5:
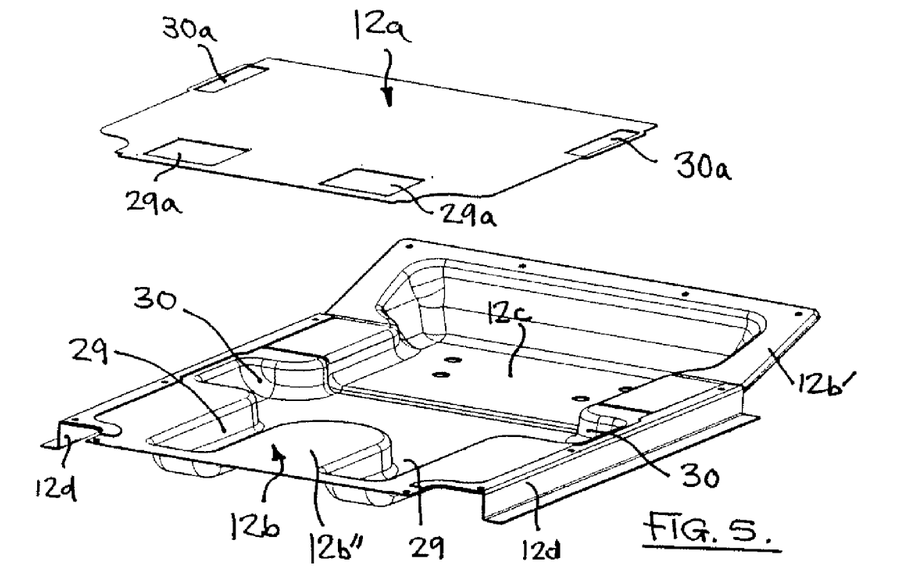
FIG. 5 shows an exploded perspective view of the two layer cab floor.
Figure 6:
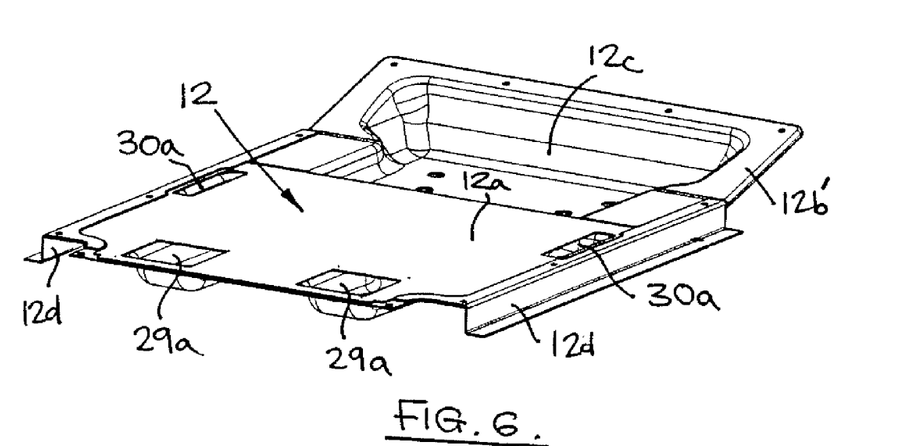
FIG. 6 shows the floor of Figure assembled.
Figure 7:
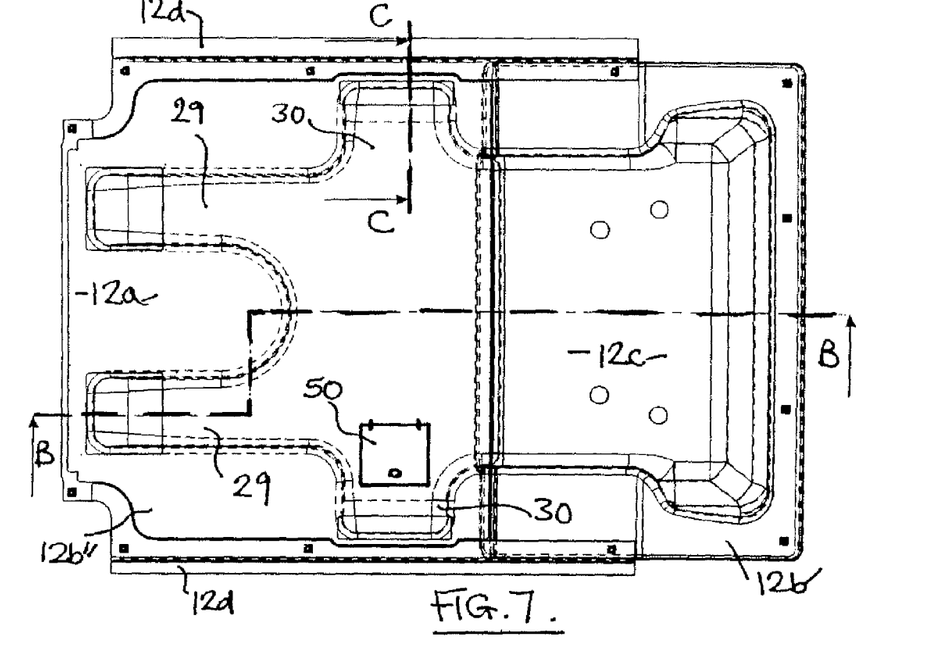
FIG. 7 shows a plan view of the floor of FIGS. 5 and 6.
Figure 8:
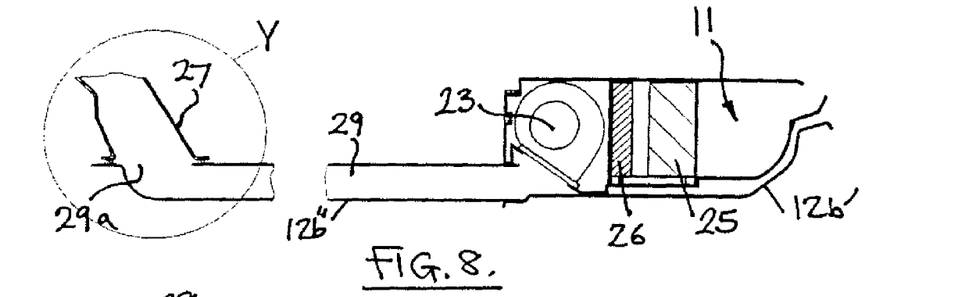
FIG. 8 shows a section on the line B-B of FIG. 7.
Figure 9:
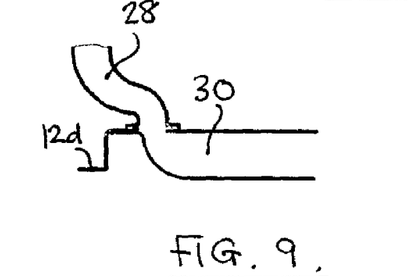
FIG. 9 shows a section on the line C-C of FIG. 7.

In accordance with the present invention the HVAC unit 11 is connected with the distributors 27 and 28 by cavities in the form of passages 29 and 30 formed in the hollow floor 12 of the cab (see FIG. 5). It is a main task of these passages in the floor to transport the air from the HVAC unit with a minimum of pressure drop and noise emission. The floor 12 comprises an upper layer 12a and a lower layer 12b which are welded and sealed together to provide the necessary structural integrity of the floor and to seal the sides of the passages 29 and 30 (see FIG. 6). The HVAC unit 11 is mounted in a recess 12c provided in the rear portion 12b' of the lower layer 12b of the floor. As most clearly visible in FIG. 8, the rear portion 12b' of the lower layer 12b of the floor is a separate component which is welded or otherwise secured to the front portion 12b'' of the lower layer. This facilitates manufacture of the lower layer 12b. Flanges 12d are welded or otherwise secured to the sides of lower layer 12b for securing the floor of the other structural portions of the cab. The upper layer 12a has outlets 29a and 30a which connect passages 29 and 30 with distributors 27 and 28 respectively as shown in FIGS. 8 and 9.

Figure 13:
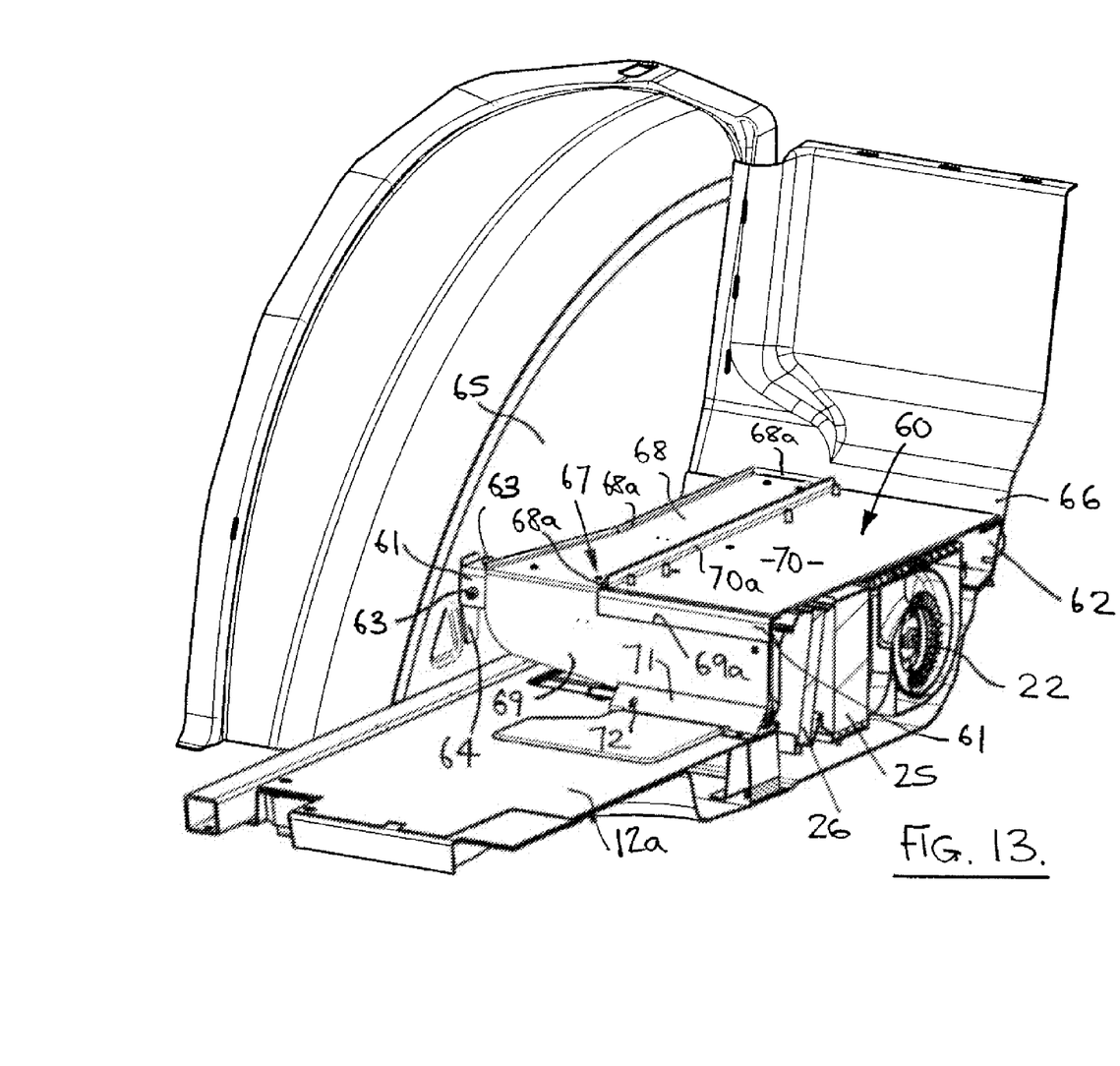
FIG. 13 shows a perspective sectional view of half of a seat support structure mounted above the HVAC unit.

As best seen in FIG. 13, a seat support structure 60 is provided above the HVAC unit 11. This support structure comprises a front L-shaped cross section cross beam 61 and a rear U-shaped cross section cross beam 62. Front cross beam 61 is bolted at 63 to brackets 64 on the inside of each wheel fender 65. Rear cross beam 62 is welded the fenders/rear wall 66 of the cab.

The support structure is completed by a folded outer support member 67 which is secured to beams 61 and 62 and has horizontal outer portions 68 adjacent the inside of each fender 65 and a front vertical portion 69 with a central cut-out 69a. The horizontal portion 68 is provided with turned up edges 68a to stiffen the component.

A central support member 70 is provided with is secured to beams 61 and 62 between the outer horizontal portions 68. Central support member 70 again has turned-up edges 70a for stiffening member 70 and is formed from a metal plate of typically 4 mm thickness to provide the necessary strength to support the seat 64 (see dotted detailed in FIG. 1) which is bolted to member 70 and to prevent the seat being pulled off member 70 in the event of a collision. A support strip 71 is secured to the cab floor at 72 for the support of vertical portion 69 of outer support member 67.

As central member 70 is separate from outer support member 68,69 it is possible to mount the seat on member 70 at a remote location and then lower the seat and member 70 into position on beams 61 and 62.

By partially recessing the HVAC unit 11 into the floor it is possible to mount the seat 64 above the HVAC unit without the seat being too high.

The floor layer 12a and 12b may be made from steel sheets which or can be made from reinforced plastics material which is glued or otherwise secured together.

The cavities formed between the floor layers 12a and 12b can also or alternatively be used to run electric wiring or hydraulic pipes or hoses through and/or for the storage of fluids such as screen washer liquid. One or more access hatches 50 are provided in the upper layer 12a of the floor to give access to the cavity between the floor layers. These hatches are accessible via access flaps in a rubber mat (not shown) which extends over the upper layer 12a of the floor.

Figure 10:
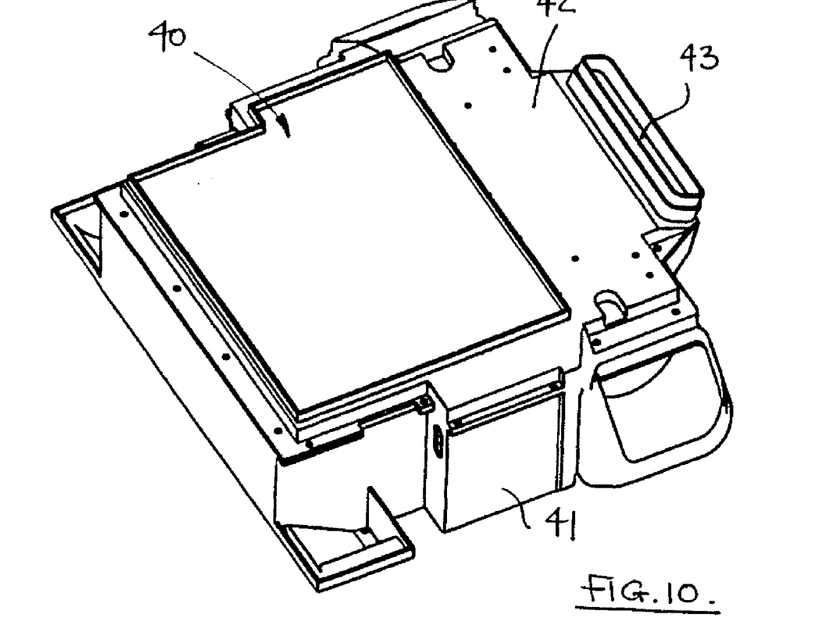
FIG. 10 shows a perspective view of a HVAC unit used in conjunction with the two layer floor of the present invention.
Figure 11:
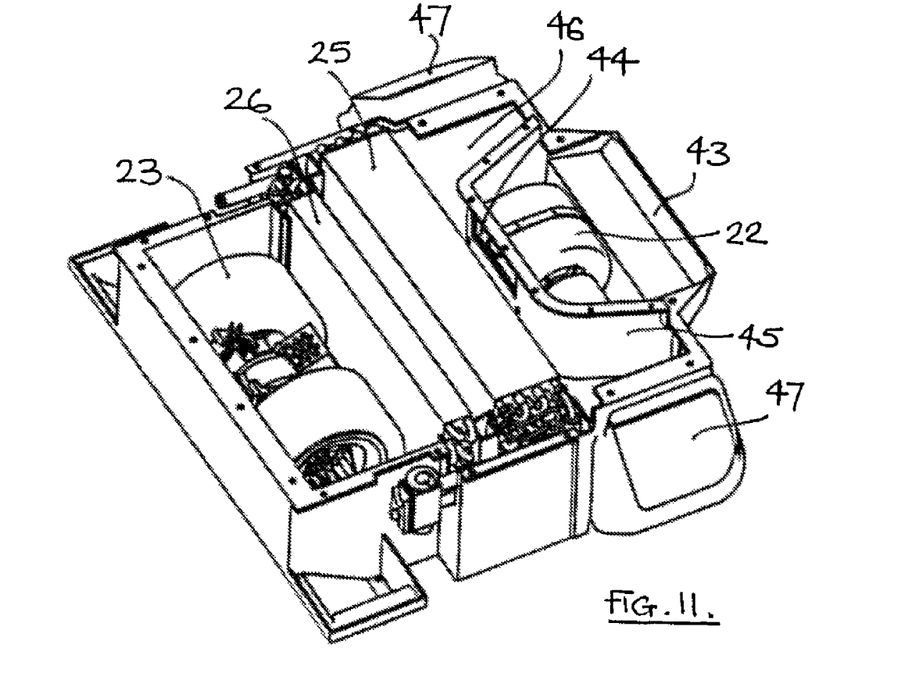
FIG. 11 shows the HVAC unit of FIG. 10 with its cover removed for clarity.

The HVAC unit 11 has a housing 40 with is preferably injection moulded and has a lower part 41 and a cover 42.

The fresh air from filter unit 17 is drawn into the HVAC unit 11 via fresh air intake 43 by the pressurization blower 22 and pushed, via an aperture 44 in a partition wall 45, into a reservoir chamber 46 which is placed ahead of the evaporator 25.

Due to the suction effect caused by main blower 23, air is also sucked via recirculation intakes 47 in the housing 40 on both sides of the HVAC unit 11 into the reservoir chamber 46. Recirculation intakes 47 are connected with ducts 24.

Both fresh air and also recirculation air are sucked into the HVAC unit in order to reduce the time to reach the cab temperature set-point and thus increase the performance of the system.

Also, in an area with unpleasant odours recirculation air is chosen to reduce smell nuisance.

Each duct 24 is provided with the recirculation air filter element 24a is placed to the side of the cab seat near the fenders. These filters must also be readily removeable for maintenance.

The fresh air and recirculation air flows, are mixed in the reservoir chamber 46 and then sucked through evaporator 25 and heater core 26. Depending on the mode or set-point of the cab temperature, heater core 26 or evaporator 25 is heating up or cooling down the air stream. Finally, the main blower 23 pushes the HVAC output air, to the distributors 27 and 28.

The ratio between fresh air and recirculated air in this embodiment is mainly regulated (in a new condition without significant filter load) by the ratio of the speeds of the pressurization blower 22 and the main blower 23. If the pressurization blower 22 is switched off or is not operating, a main blower 23 with sufficient performance can still be capable of sucking in fresh air. Thus the system can still meet the legal requirement to add fresh air to the cab in every condition to ensure air quality (to avoid suffocation and to control the CO ratio). The use of two blowers ensures that, even if the filter is very dirty and the pressure drop is increasing adequate air exchange can still be obtained.

Figure 12:
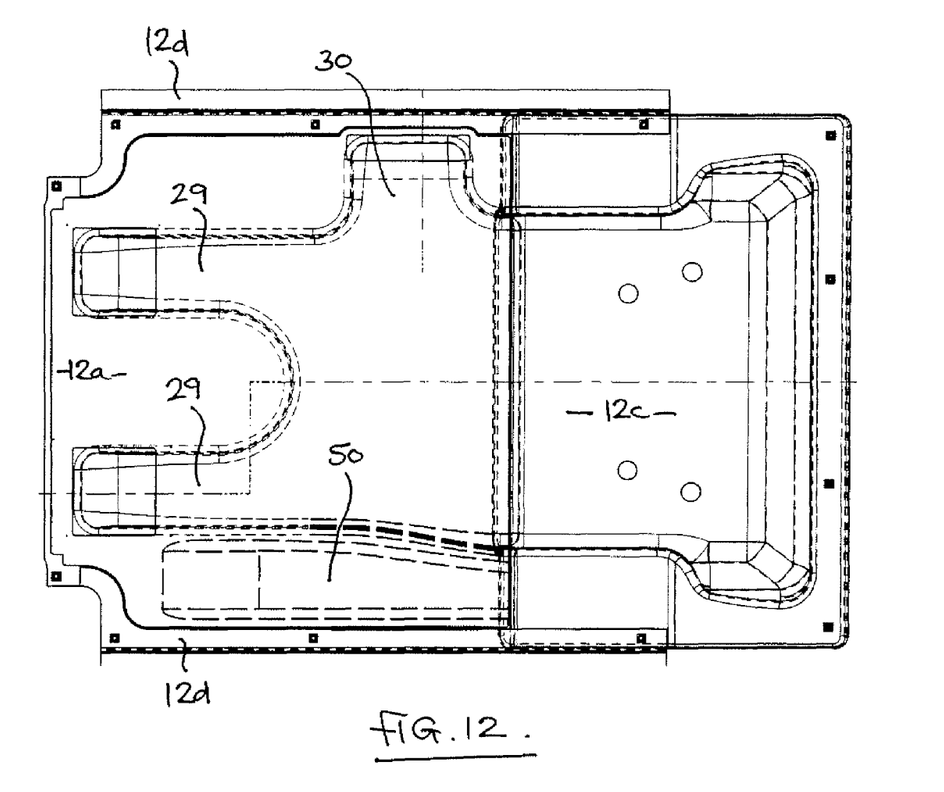
FIG. 12 shows a plan view of an alternative floor arrangement.

In a further embodiment, shown in FIG. 12, part of the cavity between the upper and lower layer can also be used to guide fresh air towards the HVAC unit. For example, the fresh air may be guided via a front pillar of the roof to the floor and the fresh air filter could be placed beneath cab door. If the HVAC unit is placed in a similar position to the previously described embodiment (on cab floor, beneath cab floor or on the rear wall of the cab), the fresh air could be guided via the passage 50 between upper and lower layer to the HVAC unit. This passage can replace on of the previously described passages 30. Alternatively, both passages 30 could be retained if passage 50 is divided by a member which keeps the fresh air and distribution air separate.

The invention claimed is:

1. A tractor cab having a floor at least part of which is of a double layer construction having an upper layer and a lower layer spaced vertically below the upper layer to define a cavity therebetween, an HVAC unit partially recessed into the floor and supported on the lower layer of a rear portion of the floor with the output of the HVAC unit directed through passages formed between the layers the upper layer including output apertures through which air from the HVAC unit can be discharged or recirculated, and air from the HVAC unit is directed forwardly along passages formed between the layers to air openings formed in a front portion of the floor, a support structure being provided above the recessed HVAC unit on which a driver's seat is mounted.

2. A cab according to claim 1 in which the upper layer is generally flat and the lower layer is curved in three dimensions to define passages between the layers along which air and/or wires and/or pipes and/or hoses can extend or volumes in which fluid or other materials and equipment can be stored.

3. A cab according to claim 1 in which the HVAC unit is supported in a depression formed in the lower layer of a rear portion of the floor and air from the HVAC unit is directed along passages formed between the layers to air openings formed in side portions of the floor.

4. A cab according to claim 3 in which outlet ducts are connected with the air openings in the front portion of the floor to direct air towards a windscreen of the cab and the front of a driver and ducts are connected with the air openings in the side portions of the floor to direct air towards side windows of the cab and the side of the driver and to act as air recirculation openings through which air can be drawn into the HVAC unit for recirculation.

5. A tractor cab according to claim 1 in which the upper floor layer has one or more access hatches through which the cavity between the layers can be accessed for the storage of fluids or other materials or equipment.

6. A tractor cab according to claim 1 in which the floor layers can be formed from metal sheets welded together or from reinforced plastics material which is glued or otherwise secured together.

7. A tractor cab according to claim 1 in which the HVAC unit draws in air via an inlet provided in a roof of the cab and down one or more hollow rear pillars of the cab through a filter located between the pillars and below a rear window of the cab.

* * * * *